Nov. 19, 1968   C. W. LOFTIN   3,411,841
REAR VIEW MIRROR-SUN VISOR ASSEMBLY
Filed March 2, 1965
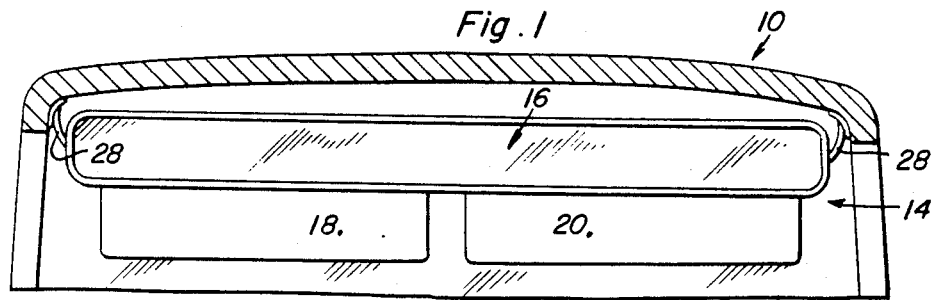
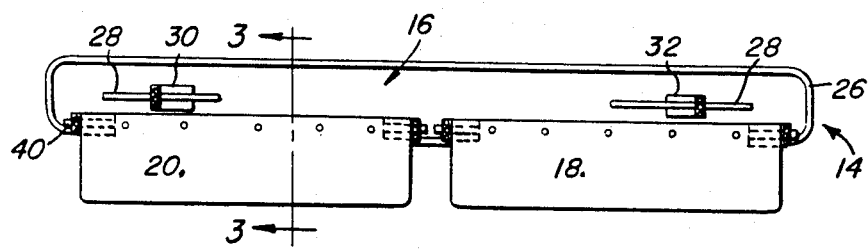
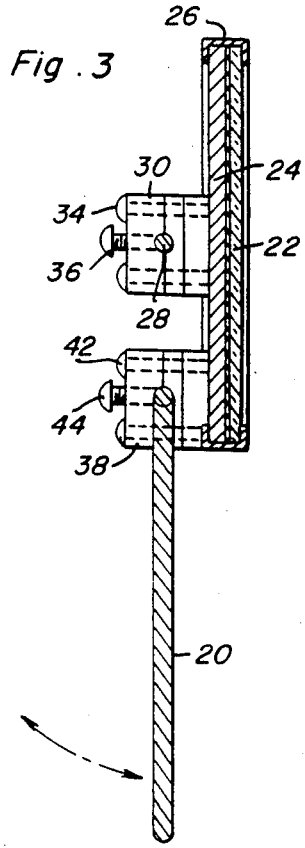
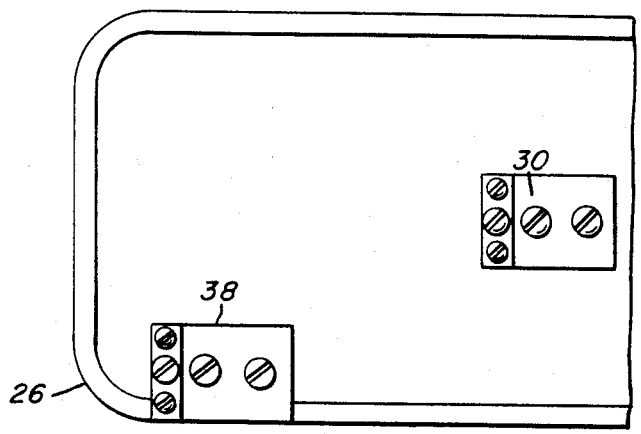
Clifford W. Loftin
INVENTOR.
BY Clarence A. O'Brien
and Harvey B. Jacobson
Attorneys 3,411,841
REAR VIEW MIRROR-SUN VISOR ASSEMBLY
Clifford W. Loftin, 1466 Wells Ave.,
Claremont, Calif. 91711
Filed Mar. 2, 1965, Ser. No. 436,541
1 Claim. (Cl. 350—277)

ABSTRACT OF THE DISCLOSURE

An elongated rectangular rear view mirror assembly extending across the entire interior width of a vehicle and including a rigid backing member having a mirror secured thereto by a peripheral frame. The backing member is provided with pillow block means for securing the mirror assembly to support arms normally disposed on opposite sides of the interior of the vehicle. A pair of rectangular opaque sun visor members are secured to the backing member of the mirror assembly, for limited pivotal movement with respect thereto, by outwardly projecting stub shafts carried by the sun visor members which shafts are rotatably journaled in pillow blocks carried by the backing member.

---

This invention relates generally to mirrors suitable for use in automobiles and more particularly to a rear view mirror-sun visor assembly which is mounted on the inside of the car forward of the driver.

The rear view mirrors generally utilized in present day automobiles do not generally afford the driver of the vehicle with a sufficiently large field of vision. On the other hand, the rear windows are generally of sufficient dimension to permit a wider reflected field of vision than is provided by the rear view mirrors generally utilized.

Attempts have therefore been made to provide rear view mirrors for automobiles which afford the driver a greatly increased reflected field of view. The mirrors have generally not been satisfactory because they normally interfere with the utilization of the sun visors.

It is therefore an object of this invention to provide a combination rear view mirror-sun visor.

It is another object of this invention to provide a rear view mirror-sun visor which may be conveniently supported by the sun visor brackets normally standard equipment on automobiles.

Still another object of this invention is to provide an improved rear view mirror-sun visor assembly which is simple in design and relatively inexpensive to manufacture.

Still a further object of this invention is to provide a rear view mirror-sun visor assembly which may be universally mounted in automobiles of various makes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front plan view of the rear view mirror-sun visor further showing the rear view mirror operatively positioned adjacent the front windshield of an automobile;

FIGURE 2 is a rear plan view of the rear view mirror-sun visor of FIGURE 1;

FIGURE 3 is an enlarged vertical cross-sectional view of the rear view mirror-sun visor taken substantially along the plane of the line 3—3 of FIGURE 2; and FIGURE 4 is an enlarged rear elevational view of a portion of the rear view mirror-sun visor.

Referring now to the drawings and FIGURE 1 in particular a portion of an automobile body is indicated generally at 10. The portion of the automobile body 10 illustrated includes a front windshield 12. The rear view mirror-sun visor embodying the present invention is indicated generally at 14.

The rear view mirror-sun visor 14 includes a mirror portion 16 and a pair of pivotally secured sun visors 18 and 20. As seen best in FIGURE 3 the rear view mirror-sun visor 14 includes a mirror portion 16 which is formed of a plate glass mirror 22 which is adhesively secured to a backing member 24 which may be formed of plywood, metal, plastic, or the like. A U-shaped molding 26 is placed in encircling relationship to the edge of the lamination formed by the mirror 22 and the backing member 24. The molding 26 may be formed of aluminum, plastic, or the like. The molding 26 may be secured to the laminate 22 and 24 by any suitable means, such as adhesive for example.

As seen best in FIGURE 1 the mirror 16 extends substantially across the entire width of the automobile so as to provide the maximum reflected field of vision. As seen best in FIGURE 2 the mirror assembly 16 is preferably supported by a pair of rods 28. The rods 28 are the cantilevered sun visor support rods which are generally standard equipment in most automobiles. The mirror 16 is operatively secured to the support rods 28 by a pair of mirror support brackets 30 and 32. The mirror support brackets 30 and 32 are split pillow blocks, thereby permitting the mirror 16 to be pivotally secured on the sun visor support rods 28 for rotation about a horizontal transverse axis. The mirror support brackets 30 and 32 are secured to the backing member 24 by rivets 34 or the like. The mirror support brackets 30 and 32 are provided with bolts or setscrews 36 which are threadably received in the outer portion of the support bracket. As seen best in FIGURE 3 the bolt 36 may be tightened against the sun visor support rod 28 to prevent any further rotational movement of the mirror assembly 16 once it has been placed in a desired position by the operator of the vehicle.

The sun visors 18 and 20, which may be formed of plastic covered fiberboard or the like, are supported by a plurality of visor support brackets 38. The visor support brackets 38 are substantially the same construction as the mirror support brackets 30 and 32. The sun visors 18 and 20 are pivotally secured in the visor support brackets 38 by means of stub shafts 40 for pivotal movement about a horizontal axis longitudinal to the mirror assembly 16. The visor support brackets 38 are secured to the backing member 24 adjacent its lower edge by means of rivets 42 or the like. The visor support brackets 38 are also provided with bolts or setscrews 44 to aid in selectively positioning the sun visors 18 and 20 by increasing the friction on the respective stub shafts 40.

As seen best in FIGURE 3 the rivets 34 and 42, or the like, which secure the mirror and visor support brackets 30, 32 and 38 to the backing member 24 also secure the respective halves of the split pillow block brackets in engaging relationship around respective rods 28 and stub shafts 40.

The sun visors 18 and 20 are shown in their use or shading position. It will be understood that when the sun visors 18 and 20 are not required that they will be moved towards a non-use position as indicated by the arcuate arrow in FIGURE 3.

As stated previously the rear view mirror-sun visor assembly 14 is operatively secured on the existing sun visor support rods 28 in the operative position illustrated in FIGURE 1. The two-point mounting afforded by the present design insures that the mirror-sun visor assembly 14 will remain in the proper viewing relationship. The rear view mirror-sun visor assembly 14 may be rotated on the sun visor support rod 28 to a point which affords the driver a reflected line of sight which intersects the road either adjacent the rear of the car, if the mirror is tilted downwardly, or at a considerably greater distance if the mirror is substantially vertical. When the assembly 14 has been set in the position desired it is merely necessary to tighten the bolts 36 of the pillow block or support brackets 30 and 32 thereby securing the assembly 14 against any further pivotal movement.

It may be seen that there has been provided a rear view mirror-sun visor assembly which provides the driver of the vehicle with an extensive field of view while also permitting customary utilization, as required, of a sun visor or sun visors. It will also be noted that the split pillow block mirror support brackets 30, 32 permit what may be called a universal mounting of the rear view mirror-sun visor assembly 14 on the sun visor brackets which are standard equipment on most automobiles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicular rear view mirror-sun rear view mirror assembly extending across the entire interior width of said vehicle and including a rigid backing member, a mirror and a continuous peripheral frame means securing said mirror to said rigid backing member, said peripheral frame member having a U-shaped transverse cross-sectional configuration, means on opposite sides of the interior of said vehicle securing the mirror assembly to the interior of the passenger compartment of a vehicle forward and above a person normally operating the vehicle, said securing means including a first pair of support brackets secured to said backing member and engageable with horizontally disposed support members carried by the vehicle, said first pair of support brackets being split pillow blocks, a pair of rectangular opaque sun visor members each secured to said backing member of said mirror assembly in normally downwardly disposed relation thereto for limited pivotal movement about a horizontal axis parallel to the plane of said backing member, each of said opaque sun visor members being provided with outwardly projecting stub shaft means, and secured to said backing member by a pair of split pillow blocks attached to the lower edge of said backing member and engageable about said stub shaft means.

References Cited

UNITED STATES PATENTS

| | | | |
|---|---|---|---|
| 1,518,956 | 12/1924 | Beitman | 350—277 |
| 1,628,218 | 5/1927 | Beauchamp | 350—282 |
| 2,323,072 | 6/1943 | Murata | 350—276 XR |
| 2,485,440 | 10/1949 | Friedheim | 296—97.13 |
| 2,511,590 | 6/1950 | Keck | 350—276 |
| 2,673,118 | 3/1954 | Phelps | 296—97.71 |
| 2,878,714 | 3/1959 | Van Denburg | 350—276 |
| 2,818,298 | 12/1957 | Goeske | 296—97.13 |

DAVID SCHONBERG, *Primary Examiner.*

P. R. GILLIAM, *Assistant Examiner.*